Patented Feb. 12, 1946

2,394,642

UNITED STATES PATENT OFFICE 2,394,642

SILICIC ACID ESTERS

Franklin Strain, Norton Center, Ohio, Albert G. Chenicek, Elmhurst, Long Island, N. Y., and Irving E. Muskat, Glenside, Pa., assignors to Pittsburgh Plate Glass Company, Pittsburgh, Pa., a corporation of Pennsylvania No Drawing. Application November 25, 1942, Serial No. 466,953

9 Claims. (Cl. 260—80)

This invention relates to a new group of unsaturated esters of silicic acid and polymers thereof. These esters having the general formula:

$$SiX_a(OR)_b$$

in which R is the radical derived from an unsaturated alcohol, X is a halogen such as chlorine, bromine, fluorine, or iodine, $a$ and $b$ may be one, two, or three and $a+b=4$.

Suitable unsaturated esters are those having 3 to 5 carbon atoms in an unsaturated chain such as allyl, crotyl, methallyl, 2-chloroallyl, isocrotyl, isopropenyl, α-ethyl allyl alcohols, divinyl carbinol, ethyl vinyl carbinol, etc. The esters of alcohols having six to ten carbon atoms in an unsaturated aliphatic chain are also useful, for example, cinnamyl, geranyl, linallyl, hexenyl, isopropylpropargyl, and phenylpropargyl alcohols.

The new esters are prepared generally from the silicon tetrachloride by reaction with an unsaturated alcohol. This reaction generally produces a mixture of the mono-, di-, or tri- esters of the unsaturated alcohol and silicic acid. The reactions are generally conducted by adding the alcohol slowly to the silicon tetrahalide, while both are kept cold. When the reagents are completely combined the temperature is raised gradually to the boiling point and then refluxed several hours.

The ester mixtures can in most instances be readily separated into their component parts by fractional distillation. The extent of unsaturation, that is, the number of unsaturated groups substituted will depend upon the reagent proportions and the duration of the reflux. Thus, with excess reagents and longer reflux periods, the higher unsaturated compounds such as triallyl chlorosilicate may be prepared in preponderant amount. Preferably the reaction is conducted under anhydrous conditions in order to prevent possible hydrolysis of the reaction product or of the silicon tetrahalide.

Mixed saturated-unsaturated chlorosilicates may be prepared by reacting silicon tetrachloride or other tetrahalide with a mixture of saturated and unsaturated alcohols after the procedure described above. It is quite apparent that a procedure of this type will produce a mixture of several mixed esters. These may frequently be separated by fractional distillation but often this is not necessary as the mixtures may be utilized as such. The proportion of the several mixed saturated-unsaturated chloro esters may be regulated by changing the proportions of reagents, the reflux temperature and the period of reaction.

The new esters are generally clear, colorless liquids having fixed freezing and boiling points. They are accordingly true chemical compounds which are generally quite stable. They may be polymerized readily to form polymers varying widely in physical properties. The new halogen esters are further valuable as intermediates for the preparations of complex molecules capable of polymerization into valuable resins. For example, triallyl chlorosilicate or other unsaturated monochlorosilicate may be reacted with one-half mole quantity of a glycol or polyglycol to produce a compound having the structure:

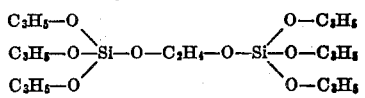

The diesters of dihalogen orthosilicic acid and an unsaturated alcohol may also be used in the preparation of alkyd resins or other esters of high molecular weight. For example, diallyl dichlorosilicate may be inter-reacted with glycols, polyglycols, glycerine or other polyhydroxy compound. Such alkyd resins are capable of further polymerization through the unsaturated bonds in the presence of organic peroxides.

Upon polymerization of the monounsaturated esters syrupy adhesive liquids or soft or hard transparent gels are secured. Generally, these polymers are soluble in the monomeric ester and in numerous other solvents. Upon polymerization of the esters which contain two or more unsaturated groups a wide variety of polymers varying from liquid syrups to insoluble solids may be obtained.

As a general rule, esters having larger numbers of unsaturated groups will polymerize more readily and to harder solid materials than will the esters having fewer unsaturated groups.

The polymerization generally must be performed under the influence of ultra-violet light and/or in the presence of an oxygen catalyst such as benzoyl peroxide, acetyl peroxide, acetone peroxide, lauroyl peroxide, ethyl percarbonate, etc. It has been discovered that the various catalysts are effective at different temperatures. For example, benzoyl peroxide is generally a good catalyst for operation between 60° C. and 90° C. but at higher temperatures it is less efficient due to decomposition. Other catalysts, such as acetone peroxide, decompose at temperatures of 135 to 175° C. These are known as high temperature catalysts and are especially effective in the polymerization of the new compounds described herein. Many products of varying hardnesses may be prepared by proper selection of catalyst and temperature of polymerization. When low temperature catalysts, such as ethyl percarbonate, are used, longer periods of heat treatment are generally required.

Polymerization may also be induced by gaseous oxygen or ozone.

Upon polymerization of some of the unsaturated silicates, especially those having two or more unsaturated groups, either alone or dissolved in suitable solvents, a viscous liquid polymer is first produced. This material is valuable as a liquid coating composition or when used to impregnate cloth, paper, felt, leather, etc., in a single layer or in multiple layers, or when used as an adhesive. Articles of paper, cloth, wood, metal, resin or mixtures thereof when coated or impregnated with the silicate ester resins and subsequently polymerized will have a hard, more attractive and corrosion resistant and relatively more fireproof than exists without the coating or can be obtained by using usual coating compositions. The resin solution containing a suitable proportion of an oxygen catalyst can be used in place of drying oils in lacquers. These may contain thinners such as alcohol, ether, benzene, acetone, petroleum ether, toluene, carbon tetrachloride or pigments such as calcium carbonate, zinc oxide, lead chromate, etc. After coating by brushing, spraying, dipping, etc., the resin coated object is cured at suitable temperatures to complete the polymerization.

Solid compositions may also be prepared by incomplete polymerization of the polyunsaturated esters. These materials resemble ordinary thermoplastic polymers such as vinyl acetate, and methyl methacrylate. As such they may be pulverized and molded under pressure which causes the resin particles to fuse and to flow and fill out the shape of the mold. Moderate temperatures are usually desired which may cause the molded article to become further polymerized. The higher polymerized modifications of the polyunsaturated esters are generally nearly infusible and substantially insoluble in solvents such as acetone, benzol, ether, etc. The soft intermediate polymers may be prepared by further polymerizing viscous liquid polymers containing unreacted oxygen catalyst until the soft solid state is reached. The catalyst added should be of such quantity that an appreciable amount still remains in the soft solid polymer to enable the polymerization to the desired final state.

Other intermediate fusible polymers may be prepared by polymerizing the polyunsaturated esters or a solution thereof until a syrup is formed and precipitating the polymer by addition of a quantity of a nonsolvent for the polymer such as ethylene glycol, ethyl alcohol, etc. In this case, the polymer is precipitated as a soft solid which can be separated from the liquid by filtration, decantation, etc. These polymers may be used as coating or molding compositions.

The esters may also be cast polymerized to form transparent cast sheets in accordance with usual methods used for cast polymerizing unsaturated esters.

The silicate ester polymers are further adaptable to many of the well known procedures for modifying physical properties of polymerizable materials. They may be used in conjunction with plasticizers such as dibutyl phthalate or other saturated alcohol esters of polycarboxylic acids, ethylene glycol bis (butyl carbonate) and the corresponding esters of propyl, ethyl, etc., alcohols and of diethylene glycol, propylene glycol, etc., camphor, tricresyl phosphate, and other plasticizers. Further, they may be copolymerized with other synthetic resins such as phenolics, cellulose acetate, urea-formaldehyde, alkyd resins, vinyl acetate, acrylic resins, protein resins, vinyl chloride, etc., and natural resins such as rubber, coumarone-indene resins, drying oils, etc.

The following examples are typical of the preparation and uses of the new unsaturated esters:

Example I 200 grams of allyl alcohol was placed in a flask equipped with a reflux condenser and separated from the atmosphere by calcium chloride tubes. Over a period of 2½ hours 380 grams of silicon tetrachloride was added while the reaction flask was submerged in an ice bath. After the reagents were combined the mixture was heated gradually to the reflux temperature and finally refluxed for three hours. The resulting ester mixture was fractionated in a column packed with glass beads. The following colorless liquid fractions were recovered:

| Pressure, mm. | Boiling point, °C. | Wt., gms. | Compound |
| --- | --- | --- | --- |
| 760 | 57.5– 57.6 | 107.1 | Silicon tetrachloride. |
| 32 | 35.5– 36 | 25.9 | $Si(OC_3H_5)Cl_3$. |
| 32 | 81.4– 81.8 | 61.2 | $Si(OC_3H_5)_2Cl_2$. |
| 32 | 114.2–114.8 | 172.2 | $Si(OC_3H_5)_3Cl$. |

Example II

Methallyl alcohol and silicon tetrachloride were reacted in an anhydrous atmosphere using the procedure described in Example I. By fractional distillation the ester mixture was divided into three portions containing substantially pure methallyl trichloro silicate, dimethallyl dichloro silicate and trimethallyl chloro silicate.

Example III

Twenty-five grams of allyl trichlorosilicate prepared as described in Example I was mixed at room temperature with 10 grams of ethyl alcohol. The mixture was heated slowly to boiling and then refluxed for two hours. The resulting liquid was found to be a mixture of several esters in which the ester allyl ethyl dichlorosilicate was present in greater quantities. It was separated by fractional distillation in a tower packed with glass beads.

Example IV

Ten grams of triallyl chlorosilicate was heated with 0.5 grams of acetyl peroxide and heated at 90° C. for two hours. A solid polymer was produced.

Example V

Twenty-five grams of diallyl dichlorosilicate and 1.1 grams benzoyl peroxide were dissolved in 300 cc. of benzene and heated at 70–75° C. for five hours. The solution had become considerably more viscous. The viscous solution was then poured into a 500 cc. quantity of methyl alcohol. A small quantity of solid polymer was obtained by filtering and drying.

Although the present invention has been described with particular reference to the specific details of certain embodiments thereof it is not intended that such details shall be regarded as limitation upon the scope of the invention except insofar as included in the accompanying claims.

I claim:
1. Triallyl chlorosilicate.
2. Diallyl dichlorosilicate.
3. Trimethallyl chlorosilicate.
4. An ester of a halogen substituted orthosilic acid and allyl alcohol.
5. A polymer of triallyl chlorosilicate.
6. A polymer of trimethallyl chlorosilicate.
7. An ester having the general formula

$$SiX_a(OR)_b$$

wherein X is a halogen radical, R is a radical corresponding to the radical R in the alcohol ROH, said alcohol being an unsaturated monohydric alcohol having from 3–10 carbon atoms and having an unsaturated carbon to carbon linkage in an aliphatic carbon chain and adjacent the beta carbon atom therein, and $a$ and $b$ are each small whole numbers, the sum of $a$ and $b$ being equal to 4.
8. A polymer of an ester defined by claim 7.
9. A polymer of diallyl dichloro-silicate.

FRANKLIN STRAIN.
ALBERT G. CHENICEK.
IRVING E. MUSKAT.